(No Model.)

H. A. BATES.
SHIFTING CLEVIS FOR PLOWS.

No. 494,729. Patented Apr. 4, 1893.

Witnesses:
J. Staib
Chas. H. Smith

Inventor:
Henry A. Bates
per Lemuel W. Serrell
Atty.

UNITED STATES PATENT OFFICE.

HENRY A. BATES, OF YONKERS, NEW YORK.

SHIFTING CLEVIS FOR PLOWS.

SPECIFICATION forming part of Letters Patent No. 494,729, dated April 4, 1893.

Application filed January 31, 1893. Serial No. 460,214. (No model.)

*To all whom it may concern:*

Be it known that I, HENRY A. BATES, a citizen of the United States, residing at Yonkers, in the county of Westchester and State of New York, have invented an Improvement in Shifting Clevises for Plows, of which the following is a specification.

In the use of a plow it is often important to change the horizontal angle of draft, in order to cause the colter and the plowshare to cut a narrower or wider swath of earth, and with this object in view the position of the clevis to the plow has been varied by the action of the lever. This has sometimes been accomplished by varying the position of a bolt, and in Patent No. 137,078, dated March 25, 1873, granted to August Kaufman, a lever is represented that can be moved without having to stop the team.

My present invention is adapted to the same object and it relates to the peculiar construction and combination of devices hereinafter described and claimed.

Figure 1:
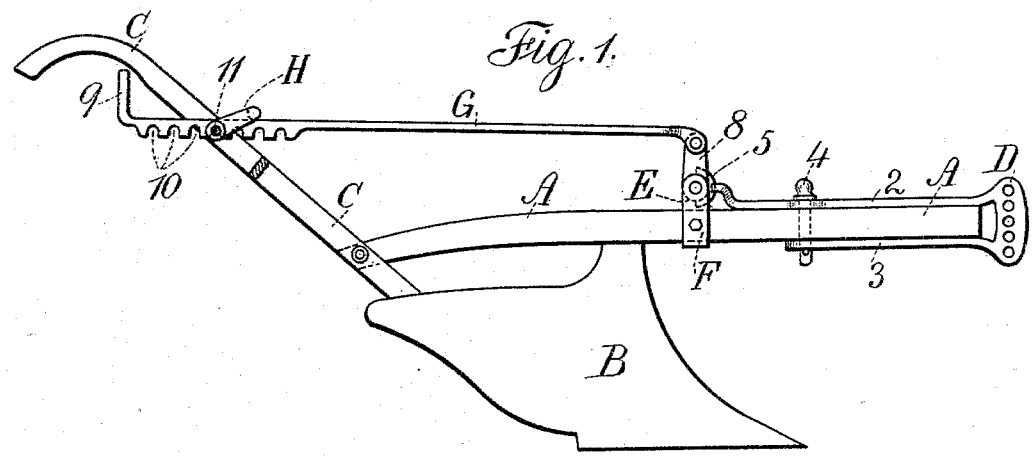
Figure 2:
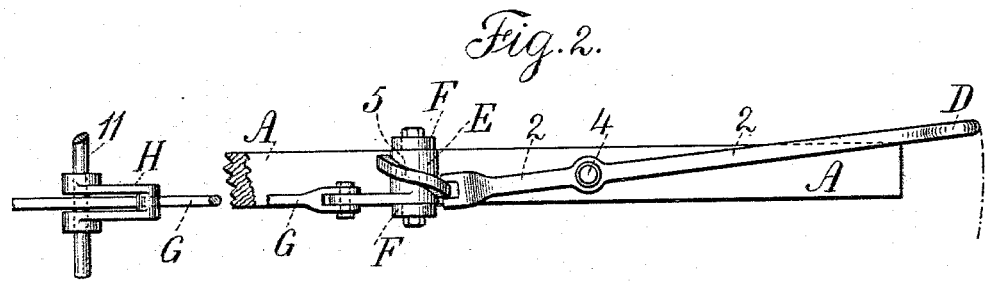
Figure 3:
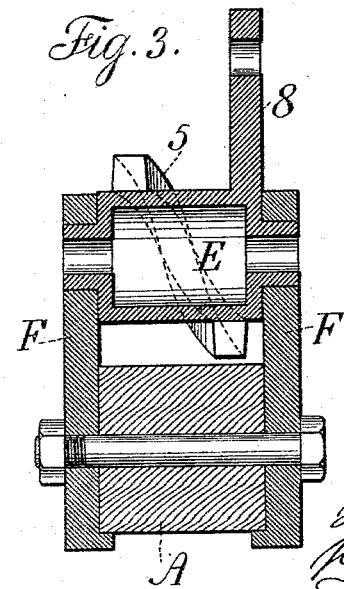

In the drawings, Figure 1 is an elevation illustrative of the manner in which the improvement is applied to a plow. Fig. 2 is a plan view in larger size of the clevis shifter. Fig. 3 is a cross section of the same.

The plow beam A and plowshare B are of any desired character and the handles C are connected as usual, and I remark that the present improvement is available with either fixed, shifting or reversible mold-boards, and the improvement may be used with wheel plows with or without a driver's seat. The clevis D is usually provided with a range of holes or with notches in the back edge of the vertical portion of the clevis, and there are bars 2 and 3 extending back from the clevis to the pivot pin or bolt 4, and the top bar 2 extends to the rear of the pivot and is forked to be acted upon by the cam rib 5 upon the shifting cylinder E, which cylinder E is supported by the bracket pieces or bearings F bolted to the sides of the plow-beam. This shifting cylinder E is preferably hollow, so as to obtain the necessary size and with as little weight as possible, and extending from this cylinder E is an arm 8 to the upper end of which the forked end of the shifter bar G is pivoted, and the shifter bar G extends to a position where the handle 9 thereof will be convenient to the driver, and in the under edge of this shifter bar G is a range of notches 10 adapted to sit over the cross bar 11 between the handles C of the plow. It will now be understood that the inclined rib or cam 5 upon the shifter cylinder E acting in the notched end of the clevis bar 2, will move the clevis horizontally and upon the pivot 4, so as to change the line of draft of the clevis to the plow-beam and share, so as to vary the action of the plow or colter thereof in cutting the swath of earth and the handle 9 and bar G are conveniently employed by the driver in giving to the shifting cylinder E a partial rotation either in one direction or the other; and I prefer to employ a crank-shaped shackle H, between the arms of which the bar G passes, and this shackle resting by its weight upon the top of the bar G serves to prevent the bar shifting when hooked upon the cross rod 11, and this cross rod 11 forming the axis of the shackle H, such shackle swings up when the handle 9 is lifted to liberate the bar in shifting the same from one notch to the other. By this improvement the direction of draft can be shifted without stopping the horses, and the parts are held in a firm and reliable manner and but little weight or expense is added to the plow.

I claim as my invention—

1. The combination with the plow and shifting clevis, of the shifting cylinder E having an inclined cam thereon to act against the rear end of the clevis bar, and a crank arm projecting from said shifting cylinder and a handle bar therewith connected by which the shifting cylinder can be moved, substantially as set forth.

2. The combination with the plow-beam, handles and cross rod, of a pivoted clevis, a cylinder and an inclined cam thereon for moving the clevis, a crank arm and shifter bar having notches to engage the cross rod between the handles, and a swinging shackle between which the shifter bar passes, substantially as set forth.

Signed by me this 27th day of January, 1893.

HENRY A. BATES.

Witnesses:
GEO. T. PICNKNEY,
A. M. OLIVER.